United States Patent
Long

(10) Patent No.: US 6,422,015 B2
(45) Date of Patent: Jul. 23, 2002

(54) PROPANE INJECTION SYSTEM AND METHOD FOR A DIESEL ENGINE

(76) Inventor: Keith A. Long, 7459 Flickinger Dr., Utica, MI (US) 48317

( * ) Notice: Subject to any disclaimer, the term of this patent is extended or adjusted under 35 U.S.C. 154(b) by 0 days.

(21) Appl. No.: 09/767,990

(22) Filed: Jan. 23, 2001

Related U.S. Application Data

(60) Provisional application No. 60/217,975, filed on Jul. 13, 2000.

(51) Int. Cl.$^7$ ................................................ F02B 33/44
(52) U.S. Cl. ..................... 60/605.2; 60/601; 123/526; 123/383
(58) Field of Search ............................ 60/605.2, 605.1, 60/601, 611; 123/525, 526, 383

(56) References Cited

U.S. PATENT DOCUMENTS

| | | | | |
|---|---|---|---|---|
| 4,617,904 A | * | 10/1986 | Pagdin | 123/525 |
| 4,632,083 A | * | 12/1986 | Reggiani | 123/527 |
| 4,953,515 A | * | 9/1990 | Fehr et al. | 123/526 |
| 5,418,675 A | * | 5/1995 | Bodenheimer et al. | 361/21 |

* cited by examiner

Primary Examiner—Hoang Nguyen
(74) Attorney, Agent, or Firm—John R. Benefiel

(57) ABSTRACT

A method and system for reliably and cost effectively operating a turbocharged diesel engine by injecting propane in gaseous form from a vehicle mounted tank into the engine by the use of a fuel pressure regulator valve responsive to the boost pressure of the engine turbocharger to adjust fuel flow correspondingly. A safety switching arrangement requires manual reactivation of the system each time the engine is restarted.

4 Claims, 1 Drawing Sheet

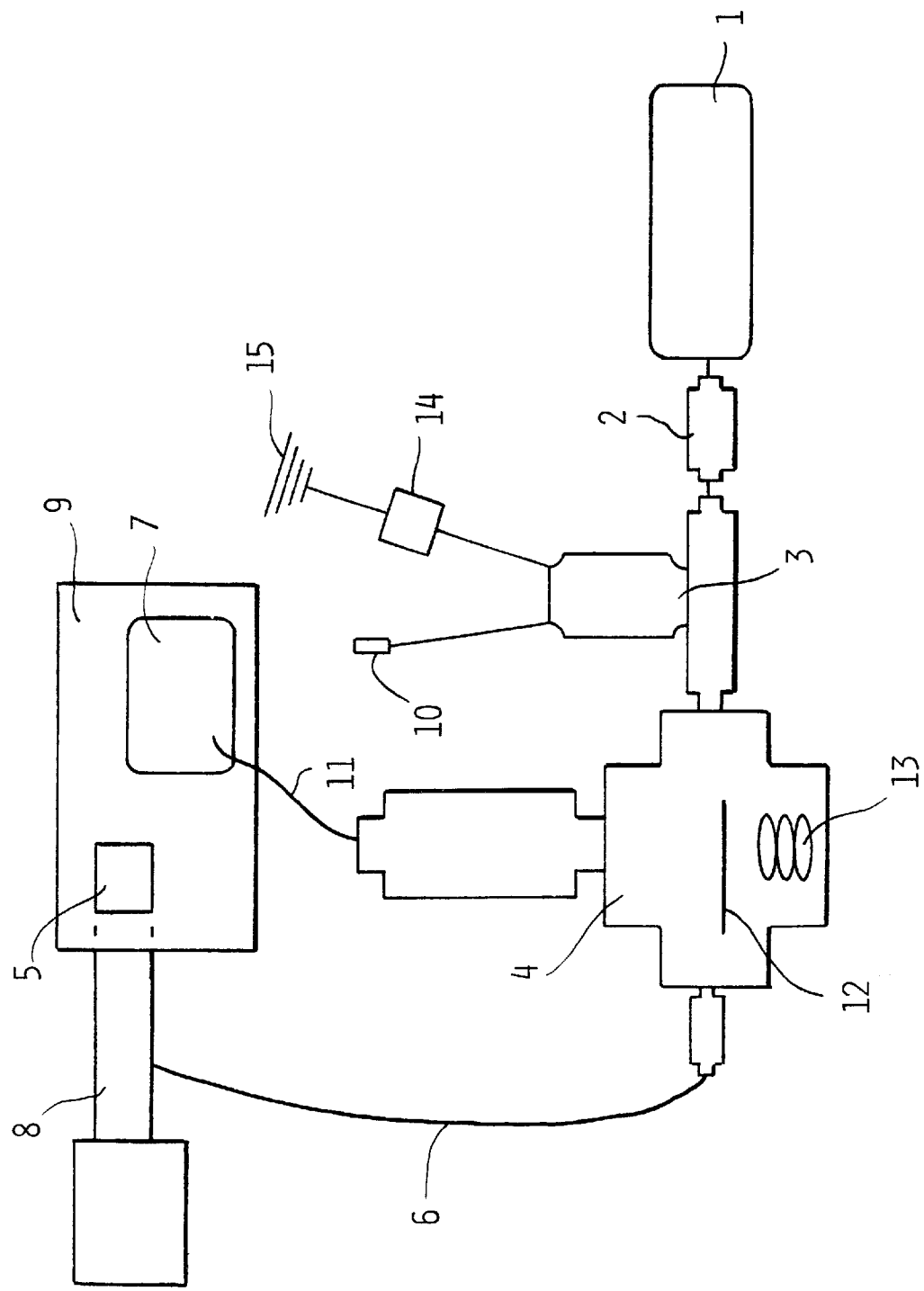

PROPANE INJECTION SYSTEM AND METHOD FOR A DIESEL ENGINE

CROSS REFERENCE TO RELATED APPLICATION

This application claims benefits from U.S. patent application Ser. No. 60/217,975, filed Jul. 13, 2000.

BACKGROUND OF THE INVENTION

This invention concerns diesel engines, and more particularly secondary fuel injection systems for turbocharged diesel engines.

Such secondary fuel injection systems have heretofore been devised to increase the power and torque output of an engine. Secondary fuels, in particular propane, act as a catalyst to enhance the combustion of diesel fuel to increase power and reduce emissions, as well as to improve engine fuel economy. Diesel engines are commonly turbocharged to increase the power output of the engine by delivering compressed air into the engine cylinders. The degree of turbocharger compression of the air would change the rate of secondary fuel injection required for a desired degree of power enhancement.

U.S. Pat. No. 4,953,515 describes a secondary fuel injection system in which an arrangement of switches and valves varies the rate of secondary fuel injection in stepwise fashion as the boost pressure reaches predetermined increased levels in order to approximate the proper rate of secondary fuel injection at each level.

This arrangement is complex as it requires a number of switches and valves, and is thus vulnerable to malfunction. In addition, the stepwise operation precludes smooth operation and only approximates the proper rate of propane fuel injection.

Another problem with such secondary fuel injection systems involves positive control over the system. If the system is activated by turning on the ignition switch, any leakage in the valves and lines could occur caused by static pressurization thereof without the engine being operated. The leakage could accumulate dangerously during servicing of the engine with the ignition switch on.

Furthermore, if the vehicle is operated by someone unaware of the pronounced power enhancing effect of the system, the unexpected power boost could create the possibility that loss of control of the vehicle powered by the engine equipped with the secondary fuel injection system could result.

Accordingly, it is an object of the present invention to provide a secondary fuel injection system for turbocharged diesel engines which automatically controls the rate of secondary fuel injection to be closely matched to the boost air pressure, using a relatively simple and reliable set up.

It is another object of the present invention to provide an arrangement for manually controlling initiation of the operation of such a secondary fuel injection system which insures against inadvertent activation of the system when the engine is started, or unwanted activation when the ignition switch is turned on without starting the engine.

SUMMARY OF THE INVENTION

These and other objects of the present invention which will be understood upon a reading of the following specification and claims are achieved by utilizing a diaphragm regulator valve to control the pressure of gaseous propane from a pressurized tank of the gaseous secondary fuel introduced into the air inlet line to the turbocharger. The boost air pressure is applied to one side of the diaphragm so that the flow rate is varied continuously in proportion to changes in the boost air pressure, thereby maintaining a proper rate of propane injection depending on the power output of the engine.

A failsafe switching arrangement insures safe operation of the secondary fuel injection system, which includes wiring the arrangement into the vehicle ignition so as to be turned off whenever the ignition switch is turned off.

In addition, a manually positioned on/off switch is combined with a "momentary on" switch booth required to be set to an on condition for the secondary fuel injection system to be activated. The "momentary on" switch is reset to an off condition whenever the vehicle ignition or the manual switch is turned off, requiring a manual push reset to the on condition after the other switches are turned back on.

This arrangement insures that an additional positive action by the vehicle operator is required to activate the system after the ignition switch and manual switch are turned on.

DESCRIPTION OF THE DRAWING

The FIGURE is a diagrammatic representation of the system and associated diesel engine components.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The invention provides a system and method for operating a turbocharged diesel engine 9 by injecting a secondary fuel, such as gaseous propane into the diesel engine 9 by means of a diaphragm regulator valve 4 that is boost pressure controlled.

The secondary fuel is injected into the engine 9 from a vehicle mounted secondary fuel tank 1 via a tank adapter fitting 2 and through an electric fuel shut off valve 3, and a regulator valve 4. The regulator valve 4 is adjusted to close off the flow of the fuel unless the engine's boost pressure reaches a predetermined pressure level. Boost pressure in the intake manifold 7 is communicated via the hose 11 to be applied to the top side of the propane regulator valve's diaphragm 12. The boost pressure working against a spring 13 located under the propane regulator diaphragm 12 allows propane to be delivered through a fuel line 6 into the engine air inlet hose 8 and then into the turbo charger compressor housing 5 at progressively increasing pressures as the boost pressure level increases to cause a corresponding increase in the mass of secondary fuel injected into engine via the air inlet hose 8.

A safety switching arrangement is also provided controlling activation of the system. The arrangement includes a manually operated on-off valve 3 used to turn the system on and off from inside the vehicle. The fuel off valve 3 is wired in to the vehicle ignition system and renders the propane injection system inoperable when the vehicle ignition is off.

A manually operated on-off power switch 10 controls the operation of the secondary fuel injection system. The power switch 10 is located inside the vehicle to allow a vehicle operator to conveniently turn the system on and off manually. A bistable momentary on switch 14 also must be reset to initiate the flow of secondary fuel. The momentary on switch 14 when closed completes the ground 15 circuit for the electric fuel shut off valve 3.

Accordingly, the secondary fuel injection system must be consciously be reactivated each time the ignition is turned on and the engine restarted. Thus, any leakage at the shut off valve 3 will not continue if the ignition is turned on during servicing on the engine 9.

As will be apparent to those skilled in the art in the light of the foregoing disclosure, many alternations and modifications are possible in the practice of this invention without departing from the spirit of the scope thereof. All such modifications are intended to be within the scope of the present invention. Accordingly, the scope of the invention is to be construed in accordance with the substance defined by the following claims.

What is claimed is:

1. A method of operating a diesel engine having manifold supplied with compressed air at a boost pressure received from a turbocharger having inlet drawing in atmospheric air and an outlet supplying compressed air to said manifold via an air passage, comprising the steps of:

controllably injecting pressurized propane in gaseous form into said engine;

substantially continuously varying the pressure of gaseous propane injected into said inlet of said turbocharger and thence into said engine intake manifold as the sensed level of boost air pressure supplied to said manifold varies.

2. Apparatus for supplying a gaseous secondary fuel to a diesel engine having a turbocharger for supplying compressed air at boost pressure to an engine intake manifold, said apparatus comprising:

a fuel pressure regulator valve interposed between a reservoir of compressed gaseous fuel and an air inlet to said turbocharger, said regulator valve being connected to said turbocharger so as to be responsive to boost pressure existing in said engine intake manifold said regulator valve continuously varying the pressure of the gaseous fuel communicated to said air inlet as said boost pressure varies whereby the pressure of secondary fuel introduced into said turbocharger air inlet is regulated in substantially continuous correspondence with the level of turbocharger boost pressure, to thereby correspondingly vary the quantity of secondary fuel injected into said engine.

3. The apparatus according to claim 2, wherein the said secondary fuel is propane.

4. In a diesel engine having a secondary fuel injector system for supplying a gaseous secondary fuel under pressure to said engine, the improvement comprising a safety switching arrangement for activating said secondary fuel injection system, said switching arrangement including a momentary on switch controlling a fuel shut off valve which must be manually reset each time air ignition for said engine is turned off to allow fuel to be supplied to said secondary fuel injection system and thus enabling operation of said secondary fuel injection system, whereby said secondary fuel injection system must be manually reactivated each time said engine is restarted in order to initiate secondary fuel injection.

* * * * *